United States Patent
Pitts et al.

(10) Patent No.: US 10,154,193 B1
(45) Date of Patent: Dec. 11, 2018

(54) NONCIRCULAR APERTURE IMAGING SYSTEM

(71) Applicant: National Technology & Engineering Solutions of Sandia, LLC, Albuquerque, NM (US)

(72) Inventors: Todd Pitts, Rio Rancho, NM (US); David B. Karelitz, Albuquerque, NM (US); Eric A. Shields, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 60 days.

(21) Appl. No.: 15/452,490

(22) Filed: Mar. 7, 2017

Related U.S. Application Data

(60) Provisional application No. 62/304,994, filed on Mar. 8, 2016.

(51) Int. Cl.
*G02B 5/00* (2006.01)
*G02B 13/08* (2006.01)
*H04N 5/232* (2006.01)

(52) U.S. Cl.
CPC ......... *H04N 5/23232* (2013.01); *G02B 5/005* (2013.01); *G02B 13/08* (2013.01)

(58) Field of Classification Search
CPC .... H04N 5/23232; G02B 5/005; G02B 13/08; G02B 13/12; G03H 2222/55; G03H 2223/21
USPC ........................................................ 348/335
See application file for complete search history.

(56) References Cited

U.S. PATENT DOCUMENTS

| | | | |
|---|---|---|---|
| 5,243,351 A | 9/1993 | Rafanelli et al. | |
| 5,363,136 A * | 11/1994 | Sztanko | H04N 3/1587 348/207.99 |
| 6,155,704 A | 12/2000 | Hunt et al. | |
| 6,865,028 B2 * | 3/2005 | Moustier | B82Y 10/00 348/36 |
| 7,612,946 B2 * | 11/2009 | Kweon, II | G02B 13/06 359/648 |
| 7,733,409 B2 * | 6/2010 | Fleury | B60R 1/00 348/148 |

(Continued)

OTHER PUBLICATIONS

Kouri, et al., "Efficient Multiframe Super-Resolution for Imagery with Lateral Shifts", in Applied Optics, vol. 53, No. 24, Aug. 2014, pp. F1-F9.

*Primary Examiner* — Pritham D Prabhakher
(74) *Attorney, Agent, or Firm* — Medley, Behrens & Lewis, LLC; Samantha Updegraff

(57) ABSTRACT

Various technologies pertaining to an imaging system with a noncircular aperture are described herein. An imaging objective with a noncircular aperture and an anamorphic lens is used to capture a plurality of image frames of a scene. Each image frame is captured at a different rotational orientation of the imaging objective with respect to the scene. Each image frame has a non-uniform spatial resolution. A composite image of the scene is generated based upon the image frames. The composite image comprises a first region that has a spatial resolution that is approximately the same as a spatial resolution of an image generated using a circular objective with a diameter equal to the largest dimension of the noncircular aperture, and a second region with a lower spatial resolution.

20 Claims, 7 Drawing Sheets

(56) References Cited

U.S. PATENT DOCUMENTS

| | | | | |
|---|---|---|---|---|
| 8,678,598 B2* | 3/2014 | Harris | ................... | G02B 13/08 |
| | | | | 353/79 |
| 8,947,532 B2* | 2/2015 | Augst | ....................... | B60R 1/00 |
| | | | | 348/148 |
| 9,580,013 B2* | 2/2017 | Wierich | .................. | G02B 5/10 |
| 2004/0169726 A1* | 9/2004 | Moustier | ............... | B82Y 10/00 |
| | | | | 348/207.1 |
| 2006/0227214 A1* | 10/2006 | Fleury | ...................... | B60R 1/00 |
| | | | | 348/148 |
| 2011/0032325 A1* | 2/2011 | Harris | ................... | G02B 13/08 |
| | | | | 348/36 |
| 2014/0293057 A1* | 10/2014 | Wierich | .................. | G02B 5/10 |
| | | | | 348/148 |
| 2015/0373369 A1* | 12/2015 | Jalali | ................... | H04N 19/132 |
| | | | | 375/240.12 |
| 2016/0133762 A1* | 5/2016 | Blasco Claret | ... | H01L 27/14625 |
| | | | | 257/432 |

\* cited by examiner

NONCIRCULAR APERTURE IMAGING SYSTEM

RELATED APPLICATION

This application claims priority to U.S. Provisional Patent Application No. 62/304,994, filed on Mar. 8, 2016, and entitled "ACIRCULAR APERTURE IMAGING SYSTEM", the entirety of which is incorporated herein by reference.

STATEMENT OF GOVERNMENTAL INTEREST

This invention was developed under Contract DE-AC04-94AL85000 between Sandia Corporation and the U.S. Department of Energy. The U.S. Government has certain rights in this invention.

BACKGROUND

In conventional optical imaging systems, a resolution of images generated by the system is ordinarily limited primarily by a size of the aperture of the system. In general, the greater the size of the system aperture, the greater the resolution of images generated by the system. Achievable resolutions of an imaging system are therefore generally determined by size, weight, and power (SWAP) considerations for a given application, as increasing the system aperture size typically requires increasing size and weight of optical components of the system. Conventional optical imaging systems use circular imaging objectives with circular apertures in order to generate images having substantially uniform spatial resolution in every direction.

SUMMARY

The following is a brief summary of subject matter that is described in greater detail herein. This summary is not intended to be limiting as to the scope of the claims.

Various technologies pertaining to imaging systems are described herein. An optical system includes an imaging objective, such as a lens, mirror, or series of optical elements, wherein the objective has a noncircular aperture. By virtue of the noncircular aperture, individual image frames of a scene taken at a given orientation of the aperture have a nonuniform spatial resolution. In general, the greater the size of the aperture in a direction, the greater the spatial resolution of images in that direction. For example, if the aperture of the system is elliptical, or a strip aperture, then an image frame will have a higher spatial resolution in an image direction aligned with the major axis of the aperture and a lower spatial resolution in an image direction aligned with the minor axis of the aperture. Images generated from a single view of the scene via a noncircular aperture therefore have a lower spatial resolution in at least one direction than images generated from a circular aperture of diameter equal to a largest dimension of the noncircular aperture. The images from the noncircular aperture can be oversampled in the lower spatial resolution direction where an image sensor has equal sampling rate in directions corresponding to the major and minor axes. An anamorphic optical system can be used to increase a field of view of the noncircular-aperture objective in a direction corresponding to the minor axis of the aperture without reducing a resolution of the image in that direction.

A spatial resolution of images generated based upon light received via a noncircular aperture can be improved by generating composite images from a plurality of image frames each taken at a different rotational orientation of the noncircular aperture. Since the nonuniform spatial resolution of the image frames is a function of the aperture geometry, for each different rotational orientation of the noncircular aperture with respect to the scene being imaged, a resultant image has its highest resolution aligned with a different direction in the scene. An image processor executes a Fourier transform over each of the image frames. The image processor then generates a composite Fourier transform based upon the Fourier transforms of the image frames. The image processor constructs the composite transform using frequency components of each of the transforms of the image frames that correspond to high-resolution components of the corresponding frames. The high-resolution frequency components can be identified based upon a known orientation of the noncircular aperture during data collection for each of the image frames. The image processor then generates the composite image by computing an inverse transform of the composite transform. The resulting composite image has a central region corresponding to a field of view of the aperture in a high-resolution direction where the central region has a substantially uniform spatial resolution that is approximately equal to the spatial resolution corresponding to the largest dimension of the noncircular aperture. The composite image further includes a second region corresponding to a wider field of view of the aperture in a low-resolution direction, as enabled by the anamorphic optics, where the second region provides low-resolution context imagery. Thus, an imaging objective that has a noncircular aperture can be used to generate composite images that have approximately equal spatial resolution to images generated using a circular aperture with a diameter equal to the largest dimension of the noncircular aperture. Therefore, for many applications a size and weight of an imaging objective can be reduced as compared to an objective with a circular aperture, without reducing a spatial resolution of the images.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
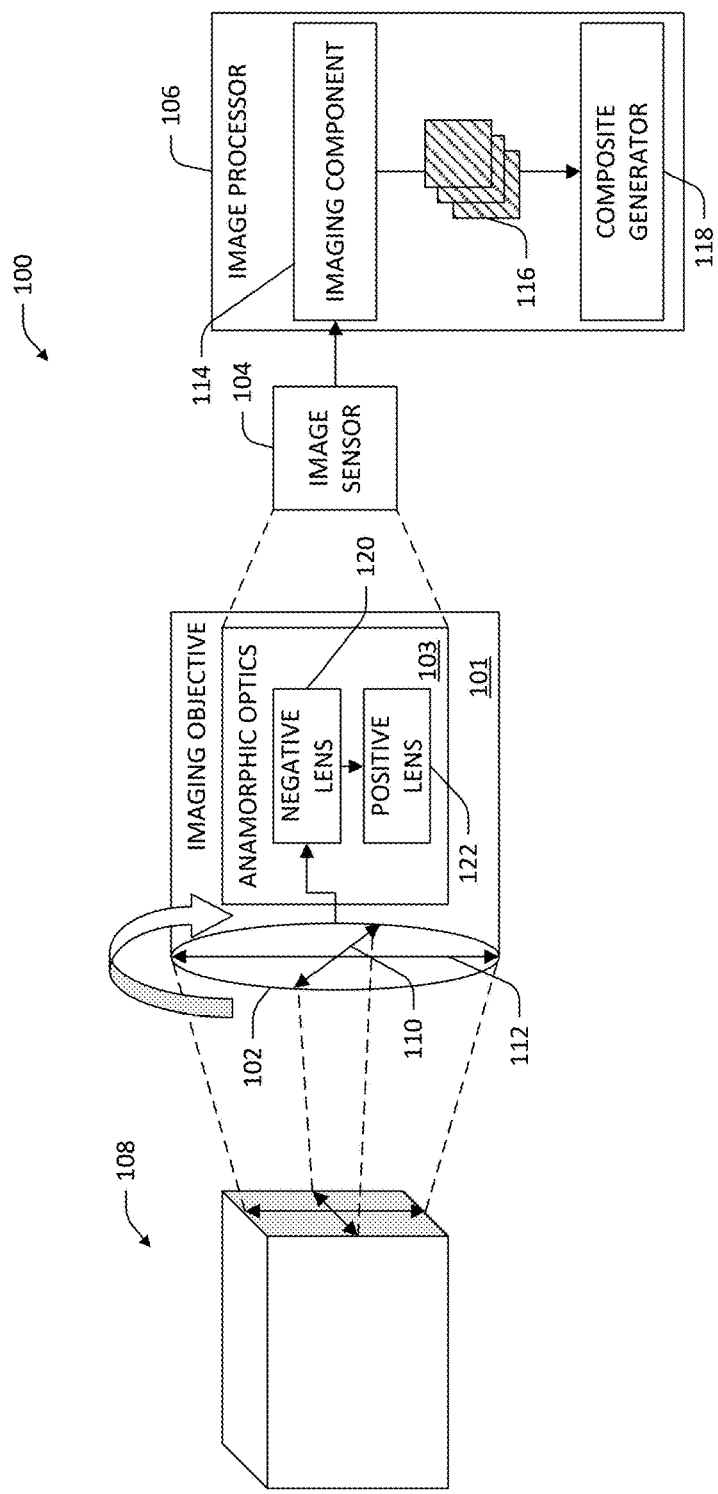
FIG. 1 is a functional block diagram of an exemplary system that facilitates imaging by way of a noncircular system aperture.

Various technologies pertaining to an imaging system having a non-symmetrical aperture are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

With reference to FIG. 1, an exemplary system 100 that facilitates imaging of a target scene or object is illustrated. The system 100 includes an imaging objective 101 that has a noncircular aperture, an image sensor 104 (e.g., a focal plane array, charge-coupled device, CMOS sensor, etc.) on which the imaging objective 101 focuses an image, and an image processor 106 that generates images based upon an output of the image sensor 104. The system 100 receives light from an imaging subject 108 such as a scene or other imaging target by way of the objective 101. The light is focused and/or reflected onto the image sensor 104 by the objective 101, whereupon an electrical output characteristic of the image sensor 104 (e.g., a voltage, resistance, charge, etc.) changes based upon intensity of the light received at the image sensor 104. The image processor 106 then generates images of the subject 108 based upon the electrical output characteristic of the image sensor 104.

The imaging objective 101 includes a primary optical element 102 (e.g., a mirror, or lens) that has a noncircular aperture, and an anamorphic optical system 103 that is configured to receive light from the primary optical element 102 and increase a field of view of the objective 101 in a single direction. By virtue of the noncircular aperture of the primary element 102, the resolving power of the system 100 is a function of angle about the system impulse response location in the image plane. For example, if the aperture of the primary element 102 is elliptical, then for a given orientation of the objective 101 relative to the subject 108, the system 100 generates images with a first spatial resolution in the direction of a minor axis 110 of the aperture of the primary element 102 and a second, higher spatial resolution in the direction of a major axis 112 of the aperture of the primary element 102. In an exemplary embodiment, the primary element 102 of the objective 101 has a length and a width that is orthogonal to the length, wherein the length is between 2 and 25 times greater than the width. For example, the major axis 112 can be between 2 and 25 times longer than the minor axis 110. In another exemplary embodiment the objective 101 can have an aperture wherein the length is between 10 and 20 times longer than the width.

Figure 2:
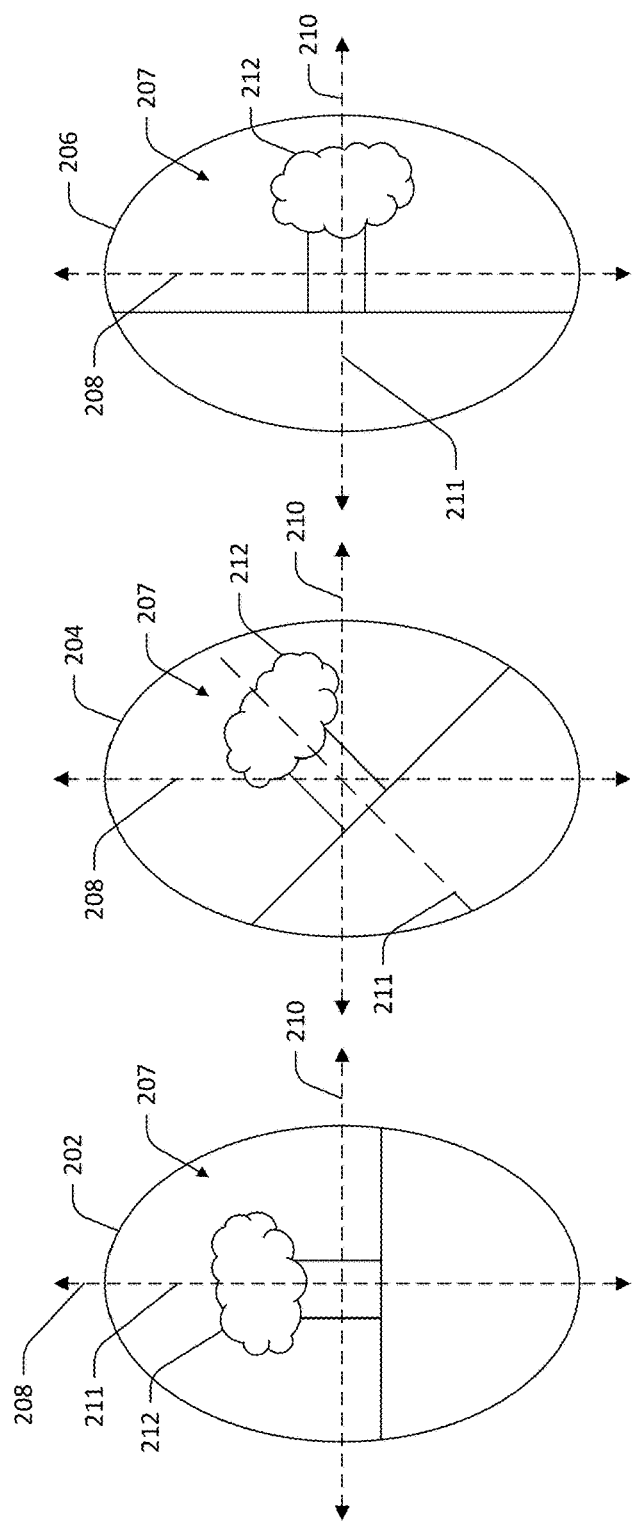
FIG. 2 is a depiction of views of an exemplary scene viewed by a noncircular system aperture.

The system 100 generates composite images of the subject 108 that have a substantially uniform spatial resolution that is approximately equal to the second, higher resolution associated with the major axis 112 of the aperture. The system 100 generates the composite images of the image subject 108 based upon light received by the imaging objective 101 at a plurality of different times, wherein the imaging objective 101 has a different rotational orientation relative to the subject 108 at each of the plurality of different times. For example, referring to FIG. 2, three exemplary views 202-206 of a scene 207 are shown, wherein each of the three views 202-206 shows a view through a non-circular-aperture imaging objective at a different rotational orientation relative to the scene.

An image frame generated from the first view 202 has a greater spatial resolution in a vertical direction parallel to the major axis 208 than in a horizontal direction parallel to the minor axis 208. The first view 202 defines a reference orientation of 0°, wherein the major axis 208 is aligned with a vertical reference axis 211 of the scene 207 (e.g., an imaginary line running through the center of a tree 212 in the views 202-206). The view 204 shows the scene 207 as seen through the objective after the objective is rotated 45° from an orientation of the objective corresponding to the first view 202. The second view 204 has an orientation of 45° between the major axis 208 and the vertical reference axis 211 of the scene 207. The spatial resolution of an image frame generated based upon the second view 204 is greatest along the major axis 208, or at an angle of 45° relative to the vertical reference axis 211 of the scene 207. Similarly, the third view 206 shows the scene as seen through the objective after the objective is rotated another 45° for a total of 90° from the first view 202 to the third view 206. The spatial resolution of an image frame generated based upon the third view 206 is greatest along the major axis 208, at an angle of 90° from the vertical reference axis 211 of the scene 207.

Operation of the system 100 in generating composite images of the imaging subject 108 is now described. Light from the imaging subject 108 is received at the objective 101, wherein the objective has a first reference orientation. The light is focused by the objective 101 onto the image sensor 104, whereupon an electrical output characteristic of the image sensor 104 changes responsive to receiving the light. The image processor 106 reads the electrical output characteristic of the image sensor 104 or otherwise receives data indicative of the electrical output characteristic from the image sensor 104 at an imaging component 114. The imaging component 114 generates a first image frame of the subject 108 based upon the electrical output characteristic or the data received from the image sensor 104. Subsequently, the imaging objective 101 is rotated to a second orientation that is offset from the first reference orientation by an angle θ. A second image frame of the subject 108 is generated by the imaging component 114 based upon light received at the image sensor 104 by way of the objective 101 at the second orientation. A plurality of n image frames 116 can be similarly generated, wherein each of then image frames 116 is taken for a different respective rotational orientation of the objective 101. In an exemplary embodiment, an angular offset of the objective 101 from one frame to the next is the same value θ, such that the angular offset from the first reference orientation for each of the n frames 116 is given by (x−1)θ, where x is the frame number. In exemplary embodiments, the plurality of n frames 116 comprises between 10 and 200 image frames. In other exemplary embodiments, the plurality of n frames 116 comprises between 25 and 100 frames. In still other exemplary embodiments, the plurality of n frames 116 comprises between 30 and 60 frames.

Responsive to generating the n frames 116, the imaging component 114 provides the frames 116 to a composite generator 118 included in the image processor 106. The composite generator 118 generates a composite image of the subject 108 based upon the image frames 116. Each of the image frames 116 comprises an image of the subject 108 that has a highest resolution in a different respective direction. Thus, a first frame in the frames 116 has a highest resolution in a first direction, a second frame in the frames 116 has a highest resolution in a second direction, a third frame in the frames 116 has a highest resolution in a third direction, etc. The directions can be defined relative to a reference axis of the subject 108 itself, such as the reference axis 211 for the scene 207 as in FIG. 2. The image processor 106 can identify the direction of highest resolution for a frame in the frames 116 based upon a known orientation of the aperture of the objective 101.

The composite generator 118 generates the composite image using the n image frames 116 based upon Fourier transforms of the image frames 116. By way of example, the composite generator 118 can generate a plurality of n Fourier transforms wherein each of the n Fourier transforms is a Fourier transform of a respective frame in the frames 116. The composite generator 118 can then construct a composite Fourier transform based upon frequency components of the n Fourier transforms. Frequency components of each of the n Fourier transforms that correspond to the direction of highest resolution for each of the image frames 116 can be identified by the composite generator 118 based upon a known orientation of the objective 101 corresponding to each of the frames 116. The identified frequency components can then be combined to construct the composite Fourier transform, wherein an inverse Fourier transform of the composite Fourier transform yields the composite image. In other examples, the point-spread-function (PSF) of the aperture of the primary element 102 can be used as a weighting function to generate the composite Fourier transform. Each of the n Fourier transforms can be multiplied by the PSF according to the orientation of the objective 101 for the respective image frame, and the resulting n weighted Fourier transforms can be combined to yield the composite Fourier transform. Weighting the transforms based upon the PSF can reduce image noise in the composite image. In another exemplary embodiment, the composite image can be constructed based upon the n Fourier transforms by way of tomographic inversion algorithms, such as the inverse Radon transform or the Fourier Slice theorem. The composite image has a substantially uniform spatial resolution that is higher than the resolution associated with the minor axis 110 of the aperture of the objective 101. For example, the composite image can have a substantially uniform spatial resolution that is approximately equal (e.g., ±5%) to the spatial resolution associated with the major axis of the aperture.

Figure 3:
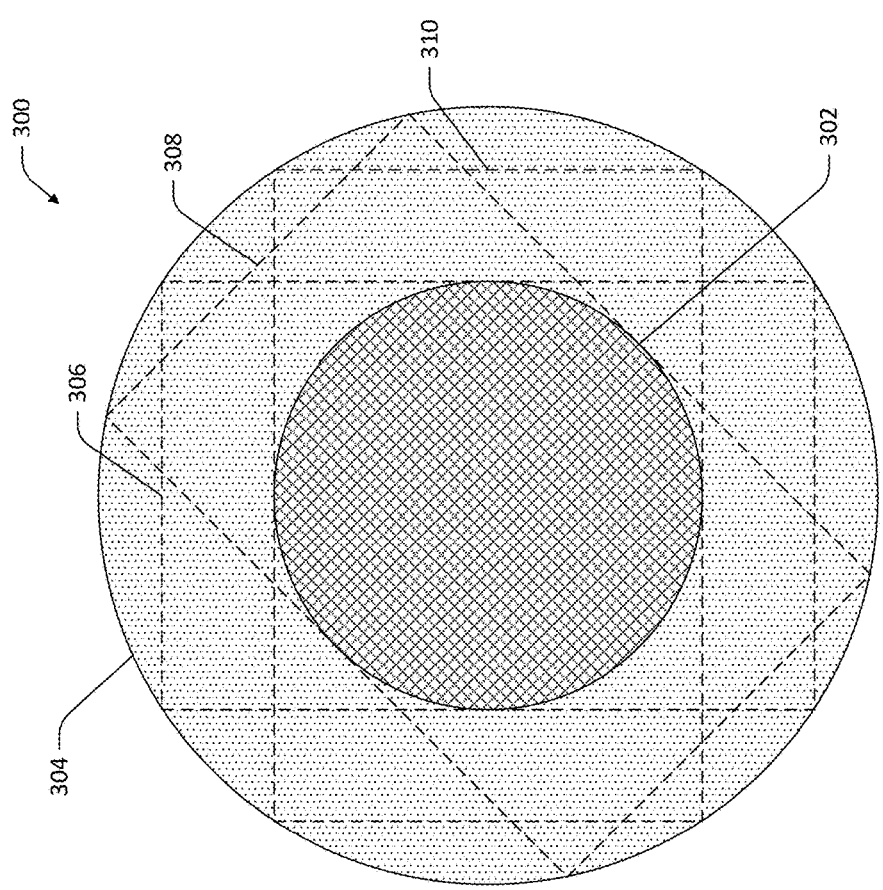
FIG. 3 is a depiction of an exemplary composite image generated based upon image frames captured by a noncircular aperture.

The anamorphic optical system 103 can be used to increase a field-of-view of composite images generated by the system 100. The image sensor 104 can be configured to have a uniform sampling rate equal to at least the Nyquist sampling rate in the direction of the major axis 112, the higher-resolution direction. In such a case, the lower-resolution direction corresponding to the minor axis 110 is over sampled. The anamorphic optical system 103 is configured to increase a field of view of the system 100 along the dimension of the minor axis 110. Since the field of view of the system 100 along the dimension of the major axis 112 is unchanged, the image frames 116 generated by the imaging component 114 when the objective 101 includes the anamorphic optical system 103 have a greater field of view in a low-resolution direction than in a high-resolution direction. Referring now to FIG. 3, a composite image 300 is shown that is based upon image frames having a field of view extended by the anamorphic optical system 103. The composite image 300 includes a first region 302 having a first field of view and a second region 304 having a second, larger field of view. Image frames 306-310 are shown for different orientations of the imaging objective 101. As a number of image frames used to generate the composite image 300 increases, the region covered by the union of the image frames asymptotically approaches coverage of the circular region 304. Both the field of view corresponding to the major axis 112 and the field of view corresponding to the minor axis 110 contribute to the image 300 in the first region 302. Thus, the first region 302 has the higher spatial resolution corresponding to the major-axis direction of the aperture. In the second region 304, only the field of view corresponding to the minor axis 110 contributes to the image 300, since the extended field of view is provided by the anamorphic optics only in the direction of the minor axis 110. Therefore, the second region 304 has the lower spatial resolution corresponding to the minor-axis direction of the aperture. Thus, inclusion of the anamorphic optical system 103 as a component of the imaging objective 101 allows a composite image 300 to be generated that includes a high-resolution central field of view region 302 as well as a larger field of view region 304 that provides lower-resolution context.

In an exemplary embodiment, the anamorphic optical system 103 comprises a Bravais system. In a conventional Bravais system, a size of the image focused on an image sensor is changed without changing a location of the image on the image sensor. In the anamorphic optical system 103, cylindrical lenses can be used to change the size of an image focused on the image sensor 104 by the anamorphic optical system 103 in a single direction. For example, in order to extend the field of view in the direction of the minor axis 110, the anamorphic optical system 103 can include a negative lens 120 that receives light from the primary element 102, and a positive lens 122 that receives light from the negative lens 120 and focuses the light onto the image sensor 104.

Rotation of the objective 101 defines a collection period over which data is collected for a single composite image. The duration of the collection period is dependent on factors such as a number of image frames used by the image processor 106 to generate the composite image, an exposure time for each image frame, a time required to rotate the objective 101, etc.

In other exemplary embodiments, the composite generator 118 employs super-resolution algorithms to generate composite images that have a spatial resolution that is limited by diffraction associated with the aperture. Exemplary super-resolution algorithms are described in Shields, Eric A. and Drew P. Kouri, "Efficient Multiframe Super-Resolution for Imagery With Lateral Shifts", *Applied Optics*, vol. 53, no. 24 (August 2014), the entirety of which is incorporated herein by reference. The composite generator 118 registers the image frames 116 to a common coordinate system based upon known motion of the objective 101 between collection of each of the image frames 116. For example, the composite generator 118 can register the image frames 116 to the common coordinate system based upon a known angular offset of the objective 101 from collection of one image frame to another. The composite generator 118 then executes a super-resolution algorithm over the registered frames to recover aliased frequency content of the frames 116. Responsive to execution of the super-resolution algorithm, the composite generator 118 outputs a composite image of the subject 108. The composite image generated by way of super-resolution techniques has a spatial resolution limit approximately equal to the diffraction limit of a circular aperture with a diameter equal to the length of the major axis 112 of the primary element 102 of the imaging objective 101. The composite image can therefore have a resolution that exceeds a resolution limit for a single image imposed by the sampling rate of the image sensor 104.

The composite image of the subject 108 includes a narrow field of view region that is resolution-limited by the diffraction limit of a circular aperture with a diameter equal to the length of the major axis 112 of the aperture, and a wide field of view region with a lower spatial resolution than the narrow field of view region. For example, referring again to FIG. 3, the narrow field of view region 302 is generated based upon super-resolution algorithms such that a resolution limit of the image sensor 104 is exceeded for the region 302. The wide field of view region 304 provides lower resolution context imagery. In the absence of the anamorphic optical system 103, the image of the central region 302 would be focused by an imaging objective to cover the entirety of the image sensor 104. Super-resolution could be applied across the entire field of view to produce a Nyquist-sampled image. In the imaging objective 101 including the anamorphic optical system 103, the central region 302 is viewed by a relatively smaller portion of the image sensor 104. Thus, a higher super-resolution factor for the system 100 including the anamorphic optical system 103 can be used than a super resolution factor for a system not using anamorphic optics to compensate for the lower sampling ratio resulting from imaging the central region 302 onto the smaller portion of the image sensor 104.

Figure 4:
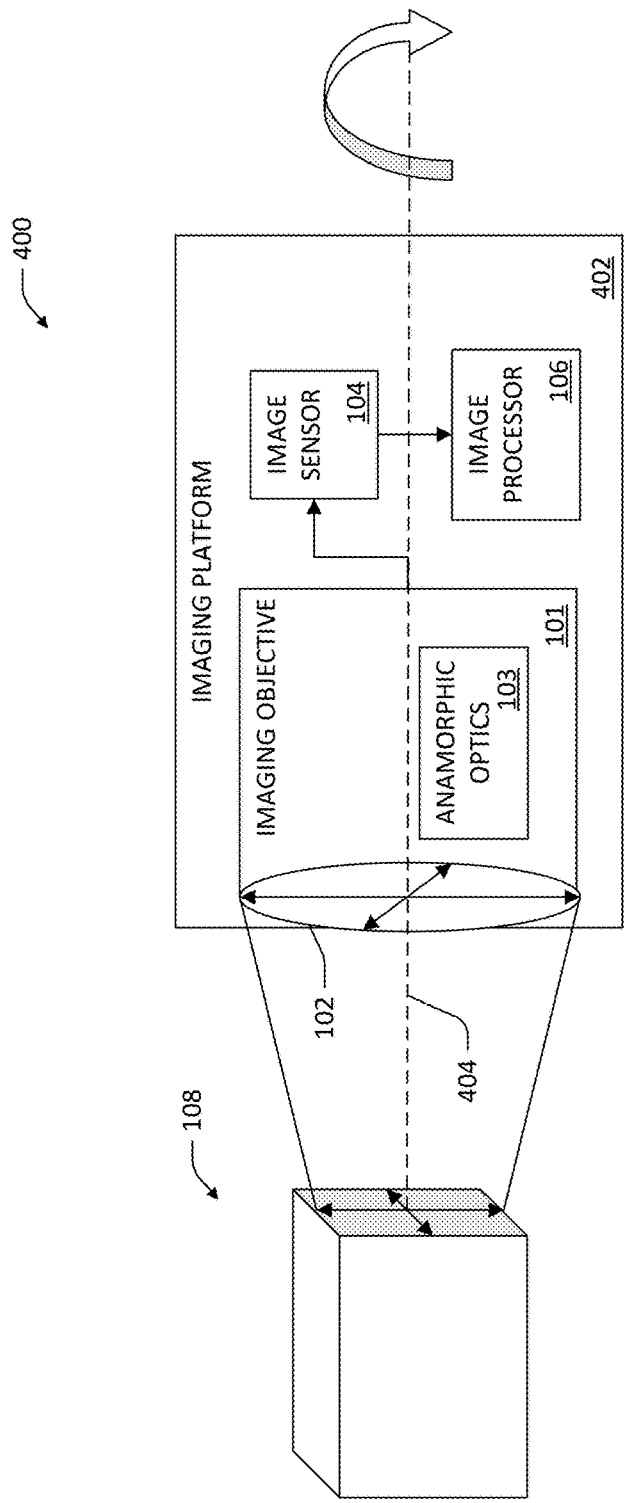
FIG. 4 is a functional block diagram of an exemplary system that facilitates imaging by way of a noncircular system aperture mounted on a movable imaging platform.

Referring now to FIG. 4, an exemplary imaging system 400 that facilitates imaging the subject 108 is illustrated, wherein the imaging objective 101 is mounted on an imaging platform 402. The imaging system 400 comprises the imaging objective 101, the image sensor 104, and the image processor 106, all of which are mounted on the imaging platform 402. By way of example, the imaging platform 402 can be an imaging satellite, and the subject 108 can be an area of the Earth in view of the objective 101 of the satellite. As shown, the imaging objective 101 can be rotated relative to the view of the subject 108 by rotating the entire imaging platform 402 around an axis 404 that runs through the center of the line of sight of the imaging objective 101.

It is to be understood that in embodiments described herein, the imaging objective 101 can be a single optical element or can include a plurality of optical elements. For example, the imaging objective 101 can be a single noncircular lens. In another example, the imaging objective 101 can comprise a plurality of optical elements (e.g., lenses, mirrors, etc.) that taken together as an optical system have a noncircular system aperture. It is further to be understood that in some exemplary embodiments, the imaging objective 101 can be stationary and the imaging component 114 can generate the image frames 116 as the imaging subject 108 rotates around an axis parallel to a line of sight of the objective 101. Thus, the composite generator 118 can generate the composite images of a rotating subject 108. It is also to be understood that the image processor 106 can be or include a hardware logic component such as a field-programmable gate array (FPGA) or application-specific integrated circuit (ASIC). In other embodiments the image processor 106 can be a computing device that comprises a processor and memory, wherein the imaging component 114 and the composite generator 118 can comprise computer-executable instructions that, when executed by the processor, cause the processor to perform some or all of the functions described herein with respect to the imaging component 114 and the composite generator 118.

Figure 5:
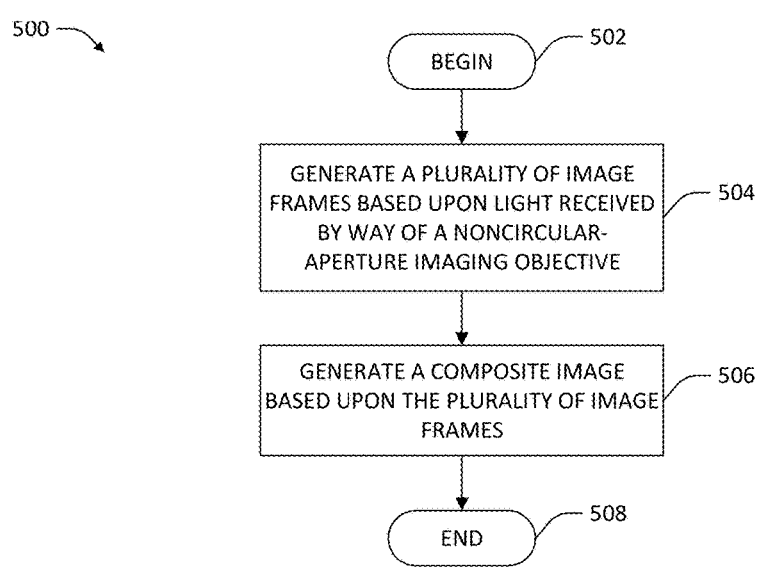
FIG. 5 is a flow diagram that illustrates an exemplary methodology for generating images of a scene based upon data collected via a noncircular aperture.
Figure 6:
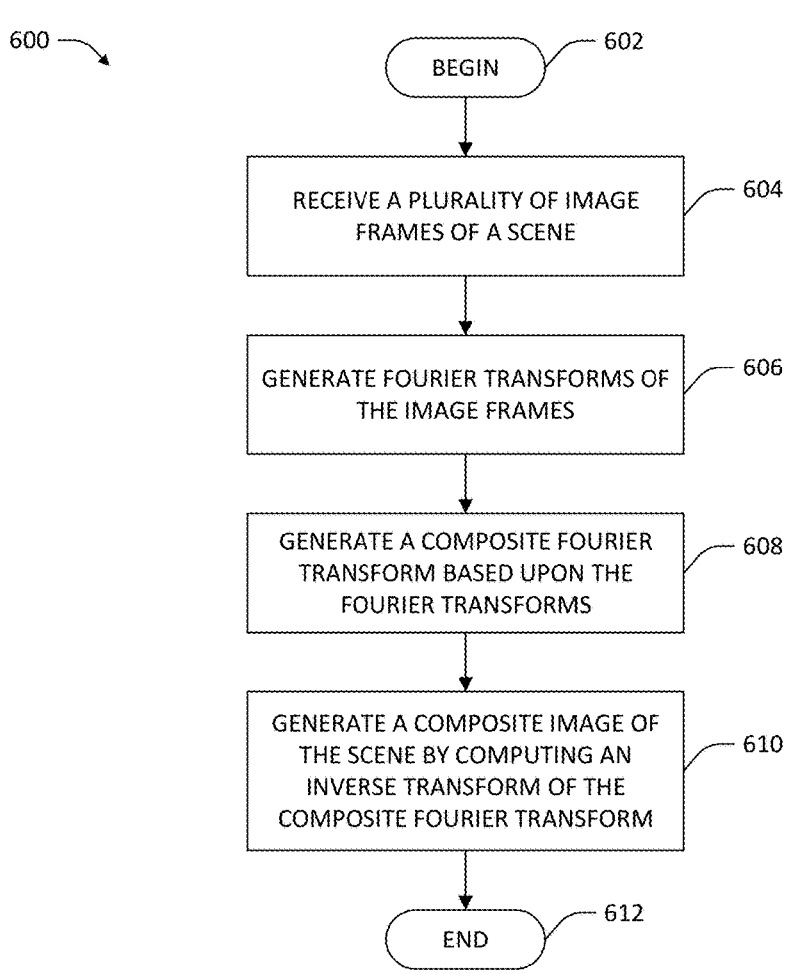
FIG. 6 is a flow diagram that illustrates an exemplary methodology for generating a composite image of a scene based upon image frames of a noncircular aperture imaging system.

FIGS. 5-6 illustrate exemplary methodologies relating to generating images of a scene based upon light collected by way of a noncircular-aperture imaging objective. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 5, a methodology 500 that facilitates generating images based upon light collected by way of a noncircular-aperture imaging objective is illustrated. The methodology 500 begins at 502, and at 504 a plurality of image frames are generated based upon light received by way of a noncircular-aperture imaging objective. Since the aperture of the imaging objective is noncircular, each of the plurality of image frames has a spatial resolution that varies with direction. For example, the image frames have a lowest spatial resolution in a direction corresponding to the smallest dimension of the aperture. Similarly, the image frames have a highest spatial resolution in a direction corresponding to the largest dimension of the aperture. Therefore, each of the image frames in the plurality of image frames has a first spatial resolution in a first direction, and a second spatial resolution in a second direction where the second spatial resolution is greater than the first resolution. At 506, a composite image is generated based upon the plurality of image frames. For example, a Fourier transform of each of the image frames can be generated, and a composite Fourier transform can be generated that comprises frequency components of the Fourier transforms that correspond to high resolution portions of the image frames. The composite image can be generated by executing an inverse transform over the composite Fourier transform, whereupon the methodology 500 ends at 508.

Referring now to FIG. 6, a methodology 600 that facilitates generating a composite image of a scene that has a substantially uniform spatial resolution based upon image frames of the scene that has a non-uniform spatial resolution is illustrated. The methodology 600 begins at 602 and at 604 a plurality of image frames of a scene are received. The image frames are generated based upon light received by way of a noncircular-aperture imaging objective, wherein each image frame corresponds to a different rotational orientation of the imaging objective with respect to the scene. By virtue of the noncircular aperture of the imaging objective, the image frames have a non-uniform spatial resolution. Each image frame has a highest spatial resolution in a direction aligned with the greatest dimension of the noncircular aperture of the objective. Thus, since each image frame is generated based upon light collected by the objective at a different rotational orientation of the imaging objective, each image frame has a highest spatial resolution in a different direction. At 606, a plurality of Fourier transforms are generated based upon the plurality of image frames, wherein each of the Fourier transforms is a Fourier transform of a different frame in the frames. At 608, a composite Fourier transform is generated that comprises frequency components of the Fourier transforms that correspond to high-resolution portions of the image frames. Frequency components of the Fourier transforms can be identified as corresponding to high-resolution portions of image frames based upon the rotational orientation of the objective for each of the image frames. At 610, an inverse transform of the composite Fourier transform is computed, wherein the inverse transform comprises a composite image of the scene. The composite image of the scene has a substantially uniform spatial resolution that is approximately equal to a highest spatial resolution of the image frames. The methodology 600 completes at 612.

Figure 7:
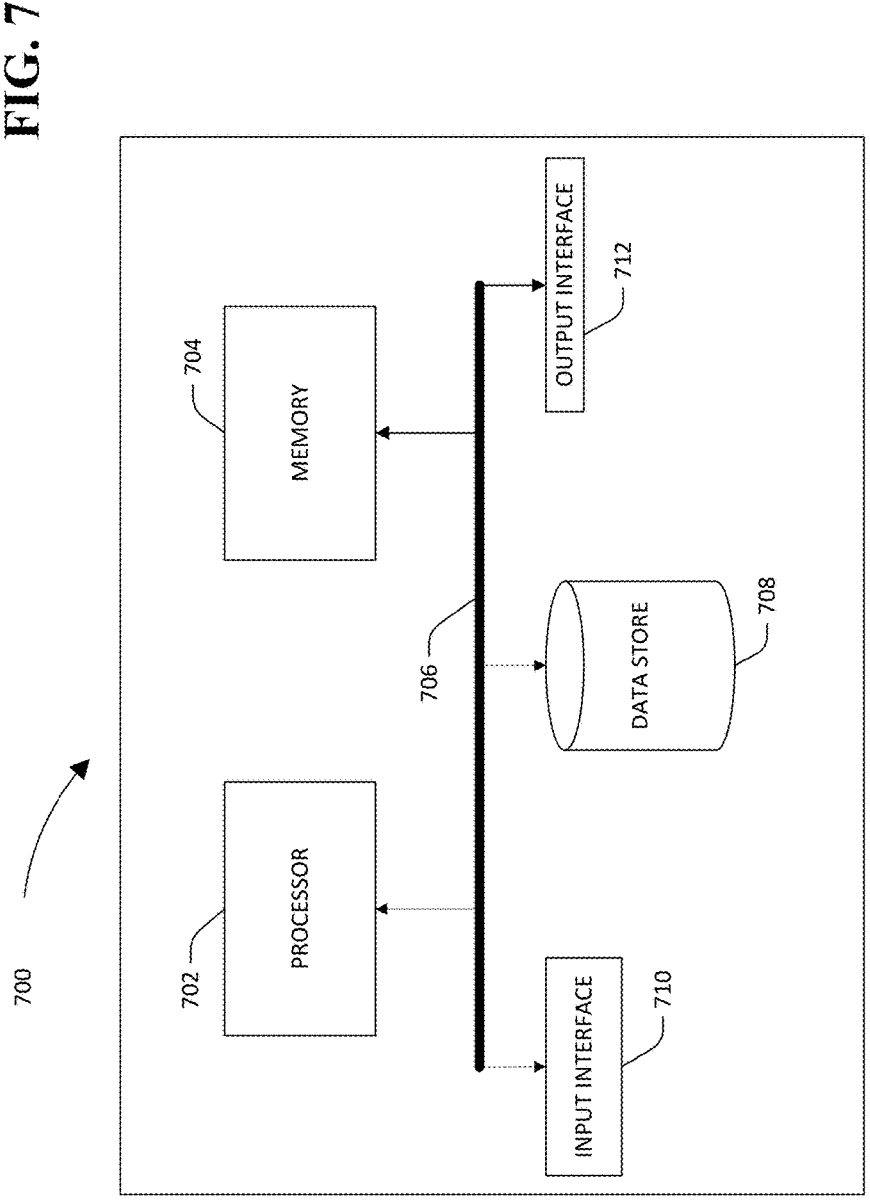
FIG. 7 is an exemplary computing system.

Referring now to FIG. 7, a high-level illustration of an exemplary computing device 700 that can be used in accordance with the systems and methodologies disclosed herein is illustrated. For instance, the computing device 700 may be used in a system that generates image frames. By way of another example, the computing device 700 can be used in a system that processes image frames of non-uniform spatial resolution to generate composite images with substantially uniform spatial resolution. The computing device 700 includes at least one processor 702 that executes instructions that are stored in a memory 704. The instructions may be, for instance, instructions for implementing functionality described as being carried out by one or more components discussed above or instructions for implementing one or more of the methods described above. The processor 702 may access the memory 704 by way of a system bus 706. In addition to storing executable instructions, the memory 704 may also store image data, Fourier transform data, etc.

The computing device 700 additionally includes a data store 708 that is accessible by the processor 702 by way of the system bus 706. The data store 708 may include executable instructions, image frames, composite images, etc. The computing device 700 also includes an input interface 710 that allows external devices to communicate with the computing device 700. For instance, the input interface 710 may be used to receive instructions from an external computer device, from a user, etc. The computing device 700 also includes an output interface 712 that interfaces the computing device 700 with one or more external devices. For example, the computing device 700 may display text, images, etc. by way of the output interface 712.

It is contemplated that the external devices that communicate with the computing device 700 via the input interface 710 and the output interface 712 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 700 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 700 may be a distributed system. Thus, for instance, several devices may be in communication by way of a network connection and may collectively perform tasks described as being performed by the computing device 700.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include FPGAs, ASICs, Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. An imaging system, comprising:
    an imaging objective comprising:
        a first optical element having a noncircular aperture;
        an anamorphic optical system configured to receive light from the first optical element, wherein the anamorphic optical system increases a field of view of the imaging objective; and
    an image processor that generates a composite image of a scene based upon light received by the imaging objective at a plurality of different times, wherein the imaging objective has a different rotational orientation with respect to the scene at each of the different times, wherein the composite image comprises a first region and a second region, the second region having a higher spatial resolution than the first region.

2. The imaging system of claim 1, wherein the image processor generates a plurality of image frames of the scene, wherein each image frame in the plurality of image frames is based upon the light received by the objective at a respective time in the different times, the composite image generated based upon the plurality of image frames.

3. The imaging system of claim 2, wherein each image frame in the plurality of image frames has a first spatial resolution in a first direction and a second spatial resolution in a second direction, the second spatial resolution greater than the first spatial resolution.

4. The imaging system of claim 3, wherein the spatial resolution of the second region of the composite image is greater than the first spatial resolution.

5. The imaging system of claim 4, wherein the spatial resolution of the second region of the composite image is approximately equal to the second spatial resolution.

6. The imaging system of claim 2, wherein the composite image is generated based upon the plurality of image frames using super-resolution reconstruction.

7. The imaging system of claim 2, wherein the plurality of image frames comprises between 10 and 200 image frames.

8. The imaging system of claim 1, wherein the anamorphic optical system comprises a Bravais system.

9. The imaging system of claim 8, wherein the Bravais system comprises:
    a negative lens that receives light from the first optical element; and
    a positive lens that receives light from the negative lens.

10. The imaging system of claim 1, the anamorphic optical system configured to increase the field of view of the objective in a direction of a smallest dimension of the noncircular aperture.

11. The imaging system of claim 1, wherein the aperture has a length and a width that is orthogonal to the length, wherein the length is between 2 and 25 times greater than the width.

12. A method, comprising:
    generating a plurality of image frames of a scene based upon light received by way of an imaging objective at a plurality of different times, the imaging objective having a noncircular aperture, the imaging objective comprising an anamorphic optical system, the anamorphic optical system configured to increase a field of view of the imaging objective in a first direction, wherein each image frame in the plurality of image frames has a first spatial resolution in the first direction and a second spatial resolution in a second direction, the second spatial resolution greater than the first spatial resolution; and
    generating a composite image based upon the plurality of image frames, wherein the composite image comprises a first region and a second region, wherein a spatial resolution of the second region is higher than a spatial resolution of the first region.

13. The method of claim 12, wherein the imaging objective has a different rotational orientation with respect to the scene at each of the different times.

14. The method of claim 12, wherein the spatial resolution of the second region is approximately equal to the second spatial resolution.

15. The method of claim 12, wherein generating the composite image based upon the plurality of image frames comprises generating the composite image based upon the plurality of image frames using a super-resolution algorithm.

16. The method of claim 15, wherein the first region of the composite image has the first spatial resolution and the second region of the composite image has the second spatial resolution.

17. The method of claim 12, wherein generating the composite image based upon the plurality of image frames comprises:
    computing a plurality of Fourier transforms, each Fourier transform in the plurality of Fourier transforms corresponding to a respective image frame;
    constructing a composite Fourier transform based upon the Fourier transforms; and
    generating an inverse transform of the composite Fourier transform, wherein the inverse transform comprises the composite image.

18. The method of claim 17, wherein constructing the composite Fourier transform based upon the Fourier transforms comprises:
    identifying frequency components of the Fourier transforms that correspond to a high-resolution direction of at least one image frame in the plurality of image frames; and
    computing a sum of the identified frequency components, wherein the sum of the identified frequency components comprises the composite Fourier transform.

19. The method of claim 17, wherein generating the composite image based upon the plurality of image frames further comprises weighting each of the Fourier transforms in the plurality of Fourier transforms based upon a point-spread function of the aperture, wherein constructing the composite Fourier transform is based upon the weighted Fourier transforms.

20. An imaging system, comprising:
an imaging objective comprising:
a first optical element with a noncircular aperture, the noncircular aperture having a minor axis and a major axis; and
an anamorphic lens configured to receive light from the first optical element, wherein the anamorphic lens extends a field of view of the imaging objective in a direction of the minor axis; and
an image processor configured to perform the following acts:
generating a plurality of image frames of a scene based upon light received by way of the imaging objective, each image frame in the plurality of image frames corresponding to a different respective rotational orientation of the imaging objective, wherein each image frame in the plurality of image frames has a highest resolution in a direction of the major axis of the noncircular aperture; and
generating a composite image of the scene based upon the plurality of image frames, wherein the composite image of the scene comprises a first region that has a substantially uniform spatial resolution that is approximately equal to the highest resolution of the plurality of image frames and a second region that has a lower spatial resolution than the first region.

* * * * *